(12) United States Patent
Hedlund et al.

(10) Patent No.: US 11,208,739 B2
(45) Date of Patent: Dec. 28, 2021

(54) PROCESS FOR SPINNING DISSOLVED CELLULOSE

(71) Applicant: TREETOTEXTILE AB, Bjärred (SE)

(72) Inventors: Artur Hedlund, Gothenburg (SE); Tobias Köhnke, Gothenburg (SE)

(73) Assignee: TREETOTEXTILE AB, Bjärred (SE)

( * ) Notice: Subject to any disclaimer, the term of this patent is extended or adjusted under 35 U.S.C. 154(b) by 458 days.

(21) Appl. No.: 16/093,286

(22) PCT Filed: Apr. 12, 2017

(86) PCT No.: PCT/EP2017/058786
§ 371 (c)(1),
(2) Date: Oct. 12, 2018

(87) PCT Pub. No.: WO2017/178532
PCT Pub. Date: Oct. 19, 2017

(65) Prior Publication Data
US 2019/0062950 A1  Feb. 28, 2019

(30) Foreign Application Priority Data
Apr. 14, 2016  (EP) ..................... 16165371

(51) Int. Cl.
*D01F 2/02* (2006.01)
*D01F 13/02* (2006.01)
(Continued)

(52) U.S. Cl.
CPC .............. *D01F 2/02* (2013.01); *B29C 48/022* (2019.02); *B29C 48/05* (2019.02); *B29C 48/08* (2019.02);
(Continued)

(58) Field of Classification Search
CPC ... D01F 2/02; D01F 13/02; D01F 1/02; C08B 1/003; B29K 2001/00
See application file for complete search history.

(56) References Cited

U.S. PATENT DOCUMENTS 2,283,809 A  5/1942  Emmette

FOREIGN PATENT DOCUMENTS

GB  744430 A  2/1956
GB  1115002 A  5/1968
(Continued)

OTHER PUBLICATIONS

European Search Report dated Oct. 24, 2016 for European Application No. EP16165371.
(Continued)

*Primary Examiner* — Michael M. Robinson
(74) *Attorney, Agent, or Firm* — Moser Taboada (57) ABSTRACT

The present invention relates to a process for forming cellulose fibers or film from dissolved cellulose. The process comprises the steps of: dissolving cellulose in an aqueous coagulation sodium salt solution to provide a cellulose spin dope; extruding the cellulose spin dope into a coagulation bath liquid comprising an aqueous coagulation sodium salt solution to provide cellulose fibers or film; withdrawing a portion of the coagulation bath comprising coagulation sodium salt and sodium hydroxide (NaOH); cooling the withdrawn portion of the coagulation bath to precipitate solid coagulation sodium salt to recover sodium hydroxide (NaOH) substantially free from the coagulation salt; and using at least a portion of the recovered sodium hydroxide (NaOH) in dissolving the cellulose to provide the cellulose spin dope.

23 Claims, 3 Drawing Sheets

(51) Int. Cl.
*C08B 1/00* (2006.01)
*B29C 48/275* (2019.01)
*B29C 48/00* (2019.01)
*B29C 48/08* (2019.01)
*B29C 48/05* (2019.01)
*B29K 1/00* (2006.01)
*B29K 105/00* (2006.01)
*D01F 1/02* (2006.01)

(52) U.S. Cl.
CPC ............ *B29C 48/278* (2019.02); *C08B 1/003* (2013.01); *D01F 13/02* (2013.01); *B29K 2001/00* (2013.01); *B29K 2105/0044* (2013.01); *D01F 1/02* (2013.01); *Y02P 70/62* (2015.11)

(56) References Cited

FOREIGN PATENT DOCUMENTS

GB 2164943 A 4/1986
WO WO2015000820 A1 1/2015

OTHER PUBLICATIONS

International Search Report dated May 17, 2017 for PCT Application No. PCT/EP2017/058786.

PROCESS FOR SPINNING DISSOLVED CELLULOSE

FIELD OF THE INVENTION

The present invention relates to a process for extruding dissolved cellulose to form cellulose fibers or films. An aqueous solution comprising a coagulation sodium salt is employed as coagulation bath liquid in the extrusion step of the process providing regenerated cellulose fibers. In the process, sodium hydroxide for use in dissolving cellulose is recovered from dispensed coagulation bath liquid by precipitation of the coagulation sodium salt.

BACKGROUND

Fibers and films have large application areas in the textile and packaging industries. For example, cellulose fibers have for long been used in textile industry for making fabric. Most commonly the cellulose has been obtained from cotton. There has however been an interest also in other sources of cellulose, such as wood. Examples of other types of fibers based on cellulose include viscose fibers and lyocell fibers.

Viscose fibers are produced by treating dissolving pulp with aqueous sodium hydroxide and carbon disulfide to obtain a spin dope of dissolved cellulose xanthate, which is used to spin the viscose fiber. Byproducts of the production process include sodium sulfate and carbon disulfide. Lyocell fibers are produced by dissolving pulp in N-methylmorpholine N-oxide (NMMO) to obtain a spin dope of dissolved cellulose, which is used to spin the lyocell fibers.

Given the need for hazardous carbon disulfide and N-methylmorpholine N-oxide, respectively, in producing viscose fibers and lyocell fibers, and the growing interest in using wood to provide textile fibers, there is an interest in alternative procedures for obtaining regenerated cellulose fibers for use in the textile industry.

An interesting alternative for obtaining regenerated cellulose fibers is the regeneration of cellulose fibers from solutions of dissolved non-derivatized cellulose, e.g. dissolving pulp. To some extent non-derivatized cellulose is soluble in aqueous sodium hydroxide and aqueous sodium hydroxide has been used as cellulose solvent in experimental procedures, though no industrial process being economically feasible is available so far.

Experimental spin dopes comprising cellulose dissolved in aqueous sodium hydroxide have been wet-spun into a coagulation bath comprising aqueous sulfuric acid. Such a procedure suffers, however, from requiring vast amounts of sodium hydroxide and produces, as a rest product, sodium sulfate. Further, such a process suffers from low cellulose concentrations in the spin dope. Thus, this process does not constitute a viable industrial process. It has also been tested in experimental scale to spin the sodium hydroxide based spin dope into alkaline salt-based coagulation bath. For this to be economical and constitute a realizable improvement, the sodium hydroxide must be separated from the salt.

Thus, there is a need in the art for a process for cellulose fiber spinning and film forming employing non-derivatized, or low derivatized, cellulose dissolved in aqueous sodium hydroxide solution as the spin dope, in which process recovered sodium hydroxide is efficient in dissolving non-derivatized, or low derivatized cellulose.

SUMMARY OF THE INVENTION

Consequently, the present invention according to a first aspect seeks to provide a process for forming cellulose fibers or film from dissolved cellulose. The process comprises the steps of:

dissolving cellulose in an aqueous sodium hydroxide (NaOH) solution to provide a cellulose spin dope;

extruding the cellulose spin dope into a coagulation bath liquid comprising an aqueous coagulation sodium salt, e.g. sodium carbonate ($Na_2CO_3$), solution, such as 14 to 32 wt % aqueous sodium carbonate ($Na_2CO_3$) solution, preferably 16 to 24 wt % aqueous sodium carbonate ($Na_2CO_3$) solution, the coagulation bath liquid being present in a coagulation vessel, to provide cellulose fibers or film;

withdrawing the cellulose fibers or film from the coagulation vessel, and withdrawing, directly and/or indirectly, a portion of the coagulation bath liquid from the coagulation bath; the withdrawn portion of the coagulation bath liquid comprising an aqueous solution of the coagulation sodium salt, e.g. sodium carbonate ($Na_2CO_3$), and sodium hydroxide (NaOH);

cooling at least a portion of the withdrawn portion of the coagulation bath liquid to a temperature of −10° C. to −35° C. to precipitate solid coagulation sodium salt, e.g. sodium carbonate ($Na_2CO_3$), being heavier than a remaining liquid phase, and to freeze water to floating ice, thereby decreasing the concentration of the coagulation sodium salt, e.g. sodium carbonate ($Na_2CO_3$), and increasing the concentration of sodium hydroxide (NaOH) in the remaining liquid phase; and separating the remaining liquid phase from the precipitated solid coagulation sodium salt, e.g. sodium carbonate ($Na_2CO_3$), and the floating ice, respectively; and using at least a portion of the separated remaining liquid phase comprising sodium hydroxide (NaOH) in said step of dissolving the cellulose and providing the cellulose spin dope.

The cellulose fibers or film withdrawn from the coagulation vessel may be stretched in a stretching bath to improve their properties. The stretching typically precedes washing step(s), although the stretching may involve washing as well. Further, the fibers or film withdrawn from the coagulation vessel may be pressed before being stretched and/or washed to reduce the amount of entrained salt(s), e.g. sodium carbonate ($Na_2CO_3$) and sodium hydroxide (NaOH).

At least a portion of the separated precipitated coagulation sodium salt, e.g. sodium carbonate ($Na_2CO_3$), which may also contain some entrained NaOH, may be provided to the coagulation vessel as coagulation bath liquid make-up, and/or to the stretching bath as stretching bath liquid make-up. Further, the separated remaining liquid phase comprising sodium hydroxide (NaOH) may be diluted with at least a portion of the separated floating ice before being used in dissolving the cellulose in providing of the spin dope.

The cellulose fibers or film withdrawn from the coagulation vessel may be washed with water in a washing step. At least a portion of the water used in the washing step may be mixed with at least a portion of the withdrawn portion of the coagulation bath liquid withdrawn from the coagulation vessel before cooling the withdrawn portion of the coagulation bath. Further, the withdrawn portion of the coagulation bath liquid may be concentrated before being cooled to precipitate the coagulation sodium salt, e.g. sodium carbonate ($Na_2CO_3$). Concentrating the withdrawn portion of the coagulation bath liquid may preferably involve applying sub-atmospheric pressure to evaporate water from the withdrawn portion of the coagulation bath.

According to an embodiment:

the cellulose spin dope comprises 4 to 12 wt %, preferably 5 to 8 wt % cellulose; and/or the cellulose in the cellulose spin dope has a degree of polymerization (DP) of 140 to 600, such as 180 to 600, 200 to 400, 160 to 400, or 180 to 300; and/or the cellulose in the cellulose spin dope has an intrinsic viscosity according to ISO5351:2010(E) of 115 to 450, such as 150 to 450 ml/g, 190 to 300 ml/g, 130 to 300 ml/g, or 140 to 230 ml/g; and/or the spindope has a shear viscosity at a strain rate of $1\ s^{-1}$ of 1 to 500 Pas, preferably 5 to 100 Pas; and/or the cellulose in the cellulose spin dope has a degree of substitution DS of not more than 0.1, preferably not more than 0.05; and/or the cellulose spin dope comprises 5 to 10 wt % NaOH, preferably, 6.5 to 8.5 wt % NaOH.

According to an embodiment, the aqueous sodium hydroxide (NaOH) solution used to dissolve the cellulose comprises:

6 to 18 wt % NaOH, such as 7.5 to 12 wt % NaOH; and/or less than 1.0 wt % coagulation sodium salt, e.g. sodium carbonate ($Na_2CO_3$), such as less than 0.5 wt % coagulation sodium salt, e.g. sodium carbonate ($Na_2CO_3$), preferably even less than 0.3 wt % coagulation sodium salt, e.g. sodium carbonate ($Na_2CO_3$); and optionally up to 2.7 wt % zinc oxide (ZnO); and/or optionally up to 15 wt % urea, such as up to 6 wt %; and/or optionally up to 15 wt % thiourea, such as up to 5 wt %; and/or optionally up to 10 wt % PEG (or other low molecular weight polymeric water soluble additive), such as up to 2 wt %; and/or optionally up to 0.5% of surfactants added as a non-reactive additive to enhance solubility and/or delay gelation. According to such an embodiment, the aqueous sodium hydroxide (NaOH) solution used to dissolve the cellulose preferably comprises 0.8 to 1.8 wt % zinc oxide (ZnO). In cooling the withdrawn coagulation bath liquid to a temperature of −10° C. to −35° C. the temperature may be controlled such that at least 75 wt % of the ZnO present in the coagulation bath liquid remains dissolved, and forms part of the remaining liquid phase after such cooling. The temperature of the aqueous sodium hydroxide (NaOH) solution used to dissolve the cellulose is preferably in the range −10 to +5° C., more preferably in the range −8 to −2° C., to obtain efficient dissolution of the cellulose.

The temperature of the cellulose spin dope upon extruding it into the coagulation bath liquid may be 5° C. to 30° C. Further, the temperature of the coagulation bath liquid upon extruding the cellulose spin dope into it may be 20° C. to 50° C., preferably 20° C. to 30° C.

According to an embodiment, the process comprises a further purification step for removing, at least partly, remaining coagulation sodium salt (e.g. sodium carbonate ($Na_2CO_3$)) from the separated remaining liquid phase comprising sodium hydroxide (NaOH) before using the sodium hydroxide (NaOH) in the step of dissolving the cellulose and providing the cellulose spin dope. In such an embodiment, the purification step may be performed by electro dialysis, ion-exchange, addition of coagulation sodium salt absorbing chemical, eutectic crystallization of sodium hydroxide (NaOH), or a combination of two or more of these. Preferably, the purification step comprises eutectic crystallization of sodium hydroxide (NaOH). The eutectically crystallized sodium hydroxide (NaOH) is, at least partly, used in dissolving the cellulose and providing the cellulose spin dope. Further, only part of the separated remaining liquid phase may undergo the purification step. The aqueous sodium hydroxide (NaOH) solution used in dissolving the cellulose to provide the cellulose spin dope, may thus be provided by mixing separated remaining liquid phase having undergone the purification step, with separated remaining liquid phase not having undergone the purification step.

According to another aspect of the invention there is provided a process for recovering an aqueous sodium hydroxide (NaOH) cellulose solvent from a spent coagulation bath liquid comprising aqueous coagulation sodium salt, e.g. sodium carbonate ($Na_2CO_3$), and sodium hydroxide (NaOH). Such a method comprises the steps of:

cooling the spent coagulation bath liquid to a temperature of −10° C. to −35° C. to precipitate solid coagulation sodium salt, e.g. sodium carbonate ($Na_2CO_3$), being heavier than a remaining liquid phase, and to freeze water to floating ice, thereby decreasing the concentration of coagulation sodium salt, e.g. sodium carbonate ($Na_2CO_3$), and increasing the concentration of sodium hydroxide (NaOH) in the remaining liquid phase; and separating the remaining liquid phase from the precipitated solid coagulation sodium salt, e.g. sodium carbonate ($Na_2CO_3$), and the floating ice, respectively, to provide recovered aqueous sodium hydroxide (NaOH) cellulose solvent. According to a preferred embodiment, the separated liquid phase comprising sodium hydroxide (NaOH) is diluted with at least a portion of the separated floating ice to provide the recovered aqueous sodium hydroxide (NaOH) cellulose solvent. The combination of reduced solubility of coagulation sodium salt, e.g. $Na_2CO_3$, in the remaining liquid phase at low temperature and the reduction of the liquid phase volume caused by freezing water to floating ice is beneficial in recovering aqueous NaOH in high purity from an aqueous solution comprising coagulation sodium salt, e.g. $Na_2CO_3$, and NaOH.

Further advantageous features of the invention are elaborated in embodiments disclosed herein. In addition, advantageous features of the invention are defined in the claims.

BRIEF DESCRIPTION OF THE DRAWINGS

These and other aspects, features and advantages of which the invention is capable of will be apparent and elucidated from the following description of embodiments of the present invention, reference being made to the accompanying drawing, in which.

DETAILED DESCRIPTION

The general concept of recovering spent sodium hydroxide in cellulose spinning processes has been discussed in WO 2015/000820, wherein the general concept of alkali recovery from a cellulose fiber regeneration step, without substantial neutralization with acids, is disclosed. WO 2015/000820 does however not provide any procedure for regeneration of substantially pure sodium hydroxide with only very low remaining amounts of the salt used in the coagulation bath. Whereas somewhat higher concentrations of salts are tolerated in dissolving high or moderately derivatized cellulose, e.g. cellulose carbamate or xanthate, in an aqueous sodium hydroxide solution, it was found that the requirements are far stricter in dissolving non-derivatized cellulose or low derivatized cellulose (i.e. derivatized cellulose with a degree of substitution (DS)<0.1) in aqueous sodium hydroxide solution.

Commercial dissolving pulp has a degree of polymerization (DP) typically in the range 500 to 900. In order to provide dissolving pulp having a DP in the suitable range for dissolution in aqueous sodium hydroxide solution special measures are however often required (for example enzymatic, acid hydrolysis, high temperature, steam-explosion, radiation and/or mechanical treatments). When the degree of polymerisation (DP) is lower than 600, the dissolving pulp starts to become more soluble in aqueous sodium hydroxide, if an appropriate method has been applied for the decrease of cellulose DP. Such treated dissolving pulp is soluble in aqueous sodium hydroxide solutions, at concentrations in the range of 4 to 12 wt % cellulose, at low temperature.

Although lower concentrations of cellulose may allow dissolution of cellulose of higher DP, the concentrations most appropriate for industrial fiber spinning (which means a cellulose concentration of preferably at least 4 wt %, more preferably at least 5 wt %, in the spin dope) will generally be difficult to prepare if the DP of the cellulose exceeds 400. The cellulose concentrations most appropriate for industrial fiber spinning are in the range 5 to 8 wt % cellulose.

Aqueous sodium hydroxide may thus be used to provide a spin dope. It has been realized that recovered sodium hydroxide must be sufficiently free from the coagulation salt to allow for re-use as an efficient solvent also for non-derivatized, or low derivatized, cellulose. It would thus be preferred to be able to recover substantially pure sodium hydroxide from a coagulation bath liquid used in spinning fibers.

Thus, there is, according to an embodiment of the invention, provided a process for forming cellulose fibers or film from dissolved cellulose comprising the steps of:
dissolving 114 cellulose in an aqueous sodium hydroxide (NaOH) solution to provide a cellulose spin dope 103;
extruding 108 the cellulose spin dope 103 into a coagulation bath liquid comprising an aqueous coagulation sodium salt, e.g. sodium carbonate ($Na_2CO_3$), solution to provide cellulose fibers or film;
withdrawing 109, directly and/or indirectly, a portion of the coagulation bath liquid comprising coagulation sodium salt, e.g. sodium carbonate ($Na_2CO_3$), and sodium hydroxide (NaOH);
cooling 107 at least a portion of the withdrawn portion of the coagulation bath liquid to a temperature of $-10°$ C. to $-35°$ C., preferably $-15°$ C. to $-30°$ C., to precipitate solid coagulation sodium salt, e.g. sodium carbonate ($Na_2CO_3$), to recover sodium hydroxide (NaOH) substantially free from the coagulation sodium salt, e.g. sodium carbonate ($Na_2CO_3$); and
using at least a portion of the recovered sodium hydroxide (NaOH) in dissolving 114 the cellulose to provide the cellulose spin dope 103. The recovered aqueous sodium hydroxide (NaOH) is cold making it suitable for direct use, without any further temperature adjustment, or after a relatively modest temperature adjustment, as cellulose solvent 102.

The cellulose to be dissolved in the aqueous sodium hydroxide (NaOH) solution is typically dissolving pulp. As recognized by the skilled person, dissolving pulp is typically bleached wood pulp with high cellulose content (>90 wt %). Its properties include a high level of brightness and uniform molecular-weight distribution. Further, the degree of polymerization (DP) of dissolving pulp for use in the present process is typically adjusted to be in the range 140 to 600, such as 180 to 600, 200 to 400, 160 to 400, or 180 to 300, wherein such adjustment of the degree of polymerization may be obtained by applying one or more out of several available and per se known processes (including enzymatic, acid hydrolysis, steam-explosion, high temperature, radiation and mechanical treatments) on commercially available dissolving pulp to decrease the degree of polymerization compared to the degree of polymerization of dissolving pulp as obtained directly from, e.g., a pulp mill. A fairly low degree of polymerization is required to be able to dissolve the cellulose, if non-derivatized or low derivatized, in sufficient concentrations for efficient industrial fiber spinning. Thus, the cellulose in the cellulose spin dope 103 may have a DP of 140 to 600, such as 180 to 600, 200 to 400, 160 to 400, or 180 to 300. Whereas cellulose having lower DP is more easily dissolved and allows for higher throughput, cellulose fibers spun from cellulose with low DP have lower mechanical strength. The required mechanical strength differs between various applications. E.g. use in textile fabrics typically requires somewhat higher mechanical strength, whereas for cellulose fibers to be used in the production of carbon fibers a lower mechanical strength may be suitable. The degree of polymerization may be determined indirectly by determining the intrinsic viscosity in accordance with ISO5351:2010(E) and calculating the DP in accordance with the formula $DP=0.7277*(IV)^{1.105}$. Further, intrinsic viscosity is an alternative measure of molecular-weight distribution. The cellulose in the cellulose spin dope 103 may preferably have an intrinsic viscosity according to ISO5351:2010(E) (measurement of the intrinsic viscosity in cupriethylenediamine (CED) solution) of 115 to 450, such as 150 to 450 ml/g, 190 to 300 ml/g, 130 to 300 ml/g, or 140 to 230 ml/g.

The resulting cellulose solution may have a viscosity of 1 to 500 Pas, as measured with an oscillatory cone-plate (4° angle; 40 mm diameter) mode on a Rheologica Nova rheometer at 1 Hz, a strain of 0.5% and 20° C. Preferably the resulting cellulose solution has a viscosity of 5 to 100 Pas.

In order to dissolve cellulose, the concentration of NaOH in the cellulose spin dope 103 is typically from 5 to 10 wt %, preferably, 6.5 to 8.5 wt % Around 7.2 to 7.8 wt % NaOH in the spin dope 103 represents an optimum. ZnO may be added, to stabilize the solutions, to weight concentrations up to 0.15 times these NaOH concentrations, preferably 0.07 to 0.15 times these NaOH concentrations. Further, the temperature should be low to improve the solubility of cellulose. The cellulose may thus be dissolved 114 at a temperature of $-10$ to $+5°$ C., preferably $-8$ to $-2°$ C. The cellulose spin dope 103 will typically comprise 4 to 12 wt %, preferably 5 to 8 wt % cellulose.

As the present invention seeks to avoid, or at least minimize, the use of various chemicals used to derivatize cellulose before dissolving it, the cellulose is preferably non-derivatized cellulose. Further, also low derivatized cellulose may be used. Such low derivatized cellulose may have a degree of substitution (DS) of not more than 0.1.

While even a DS of not more than 0.1 is fairly low, it is preferred to employ low derivatized cellulose with an even lower DS, such as a DS of not more than 0.05. Thus, the low derivatized cellulose may be provided by derivatization processes employing ethylene oxide or propylene oxide. The degree of substitution (DS) is according to an embodiment less than that degree of substitution (DS) that would be required to be able to completely dissolve more than 1 g of substituted cellulose in 50 g of an aqueous sodium hydroxide solution comprising 8 wt % sodium hydroxide, without additional additives, at +10° C. According to an embodiment, the degree of substitution (DS) in low derivatized cellulose is lower than a threshold degree of substitution (DS) corresponding to the degree of substitution (DS) that would be required to be able to completely dissolve more than 1 g of substituted cellulose in 50 g of an aqueous sodium hydroxide solution comprising 8 wt % sodium hydroxide, without additional additives, at +10° C.

As the cellulose to be dissolved is non-derivatized cellulose or low derivatized cellulose, being far less soluble than those medium or highly derivatised cellulose products used in known processes, such as the viscose the aqueous sodium hydroxide (NaOH) solution used in the present process for dissolving 114 the cellulose should preferably comprise less than 1.0 wt % coagulation sodium salt, e.g. sodium carbonate ($Na_2CO_3$). Even small amounts of coagulation sodium salt, e.g. sodium carbonate ($Na_2CO_3$), will drastically lower the solubility of the cellulose. Preferably, the aqueous sodium hydroxide (NaOH) solution comprises less than 0.5 wt % coagulation sodium salt, e.g. sodium carbonate ($Na_2CO_3$), and more preferably even less than 0.3 wt %. In order to be able to re-use recovered sodium hydroxide from the coagulation bath, comprising high amounts of coagulation sodium salt, e.g. sodium carbonate ($Na_2CO_3$), the coagulation sodium salt, e.g. sodium carbonate ($Na_2CO_3$), must thus be nearly completely removed. The step of removing coagulation sodium salt, e.g. sodium carbonate ($Na_2CO_3$), is further discussed below.

Dissolving pulp 101 comprises water. The concentration of sodium hydroxide is thus higher in the solution used to dissolve the cellulose than in the cellulose spin dope 103 to compensate for the dilution. The aqueous sodium hydroxide (NaOH) solution used in dissolving 114 the cellulose may thus comprise 6 to 18 wt % sodium hydroxide (NaOH), such as 7.5 to 12 wt % sodium hydroxide (NaOH). Further, ZnO may be added, to stabilize the solutions, to weight concentrations up to 0.15 times these NaOH concentrations, preferably 0.07 to 0.15 times these NaOH concentrations. As the aqueous sodium hydroxide (NaOH) solution used to dissolve the cellulose becomes diluted in the coagulation as well as in the following washing steps 105, it is preferred to up-concentrate the sodium hydroxide during the recovery of the sodium hydroxide from the coagulation bath liquid. By cooling 107 the withdrawn portion of the coagulation bath liquid to a temperature of −10° C. to −35° C., such as −10° C. to −32° C., −15° C. to −32° C., −15° C. to −30° C., or −20° C. to −30° C., resulting in precipitation of solid, e.g., sodium carbonate ($Na_2CO_3$), part of the water content of the coagulation bath liquid will freeze to floating ice, thereby increasing the concentration of sodium hydroxide (NaOH) in the remaining liquid phase. The cooling step thus not only serves to remove sodium carbonate ($Na_2CO_3$), but also to increase the concentration of sodium hydroxide (NaOH) in the remaining liquid phase. Furthermore, the fact that water is solidified to form ice, due to the low temperature used in the cooling step, results in a reduction in the liquid water content and thereby the concentration of sodium carbonate ($Na_2CO_3$) remaining in the remaining liquid phase increases, and this causes further precipitation of solid sodium carbonate ($Na_2CO_3$) and increases the sodium carbonate ($Na_2CO_3$) separation efficiency further. As recognized by the skilled person, the temperature at which the remaining liquid phase freezes sets a lower limit for the cooling. This temperature is about −35° C. Although, the temperature of the resulting solid material could be further lowered, this will not change the relative proportion of salts therein.

Apart from sodium hydroxide acting as the major solvent, the aqueous sodium hydroxide (NaOH) solution used in dissolving 114 the cellulose may comprise further non-reactive additives to enhance solubility of cellulose and/or delay gelation. Examples of such additives include urea, thiourea, PEG and various surfactants. Thus, the aqueous sodium hydroxide (NaOH) solution used in dissolving the cellulose may comprise:
- up to 15 wt % urea, such as up to 6 wt %; and/or
- up to 15 wt % thiourea, such as up to 5 wt % thiourea; and/or
- up to 10 wt % polyethylene glycol (PEG) or other low molecular weight polymeric water soluble additives, such as up to 2 wt % polyethylene glycol (PEG) or other low molecular weight polymeric water soluble additives; and/or
- up to 0.5 wt % of surfactants added as a non-reactive additives to enhance solubility of cellulose and/or delay gelation.

Further, the aqueous sodium hydroxide (NaOH) solution used in dissolving 114 the cellulose may comprise zinc oxide (ZnO) up to 0.15 times the NaOH concentration, such as up to 2.7 wt % ZnO for a solution comprising 18 wt % NaOH. Zinc oxide (ZnO) represents a preferred additive for reducing the risk of unwanted gelation in the spin dope 103. The aqueous sodium hydroxide (NaOH) solution used in dissolving the cellulose may thus preferably comprise 0.3 to 2.7 wt % zinc oxide (ZnO), preferably 0.8 to 1.8 wt % zinc oxide (ZnO).

It was surprisingly found that zinc oxide actually remains in solution upon cooling 107 the withdrawn portion of the coagulation bath liquid to precipitate solid sodium carbonate ($Na_2CO_3$) or another coagulation sodium salt. This implies the present process is well suited for recovering cellulose solvents 102 comprising sodium hydroxide as well as zinc oxide and being used in extruding cellulose spin dopes 103 into a coagulation bath liquid comprising sodium carbonate ($Na_2CO_3$) or another coagulation sodium salt. This is particularly useful as dissolution of ZnO in the solution at practical rates requires heating and subsequently cooling of the solution oncemore, at significant cost.

The lower the temperature in cooling 107 the withdrawn portion of the coagulation bath liquid, the greater the risk of precipitating zinc oxide. Thus, the temperature in cooling 107 the withdrawn coagulation bath liquid to a temperature of −10° C. to −35° C., such as −10° C. to −32° C., −15° C. to −32° C., −15° C. to −30° C., or −20° C. to −30° C., is preferably controlled to a temperature that is within this range and at which at least 75 wt % of the zinc oxide (ZnO) present in the coagulation bath liquid remains dissolved.

The cellulose spin dope 103 may be used to provide cellulose fibers of film. Extruding 108 the cellulose spin dope 103 into a coagulation bath liquid will precipitate the dissolved cellulose to regenerate cellulose fibers. In the art, the coagulation bath liquid has often been an acidic coagulation bath liquid neutralizing the sodium hydroxide to precipitate cellulose. This however implies that recovery of sodium hydroxide not is economical feasible. According to the present invention, the coagulation bath liquid comprises an aqueous coagulation sodium salt, preferably sodium carbonate ($Na_2CO_3$). Preferably the coagulation bath liquid comprises 14 to 32 wt % sodium carbonate ($Na_2CO_3$), more preferably 16 to 24 wt %. The coagulation bath liquid is present in a coagulation vessel 104.

Alternative, but less preferred coagulation sodium salts include sodium salts wherein the counter ion is a carboxylate (e.g. formate, acetate, propionate, butyrate or benzoate), an aliphatic or aromatic sulfonate (e.g. benzenesulfonate, toluenesulfonate, or methanesulfonate), an aliphatic or aromatic phosphonate ion or mixtures thereof. The coagulation sodium salt is sodium salt having solubility in water at 30° C. exceeding 20 wt % and solubility in water at −20° C. lower than 1 wt %. Preferably, the anionic counter ion has a dense electric charge, placing it in the beginning of the Hofmeister series also known as the lyotropic series. Anionic counter ions having a dense electric charge are characterized as strongly "salting out" proteins, due to their ability to increase surface tension and organize water molecules in solvation shells around them. Further, the coagulation sodium salt is preferably a sodium salt precipitating as a hydrate; preferably the molar ratio $H_2O$:sodium salt in the precipitated hydrate is at least 4:1.

The type of orifice used in extruding 108 the cellulose spin dope 103 will affect the dimensions and properties of the resulting cellulose fibers of film. The skilled person is familiar with extruding cellulose spin dope 103 to provide cellulose fibers of film.

In extruding 108 the cellulose spin dope 103 into the coagulation bath liquid, the temperature of the cellulose spin dope 103 is typically somewhat higher than in dissolving the cellulose. The temperature of the cellulose spin dope 103 upon extruding 108 the cellulose spin dope 103 into the coagulation bath liquid may thus be 5° C. to 30° C. Further the temperature of the coagulation bath liquid is typically higher than the temperature of the cellulose spin dope 103. The temperature of the coagulation bath liquid may be 20° C. to 50° C., preferably 20° C. to 30° C.

Once formed, the cellulose fibers or film are withdrawn 109 from the coagulation bath. In withdrawing 109 the cellulose fibers or film, part of coagulation bath liquid will be entrained by the fibers or film and thus withdrawn from the coagulation vessel therewith. Furthermore, depending on the overall mass balance of the process, additional coagulation bath liquid may be withdrawn directly from the coagulation bath. The withdrawn portion of the coagulation bath liquid will comprise an aqueous solution of coagulation sodium salt, e.g. sodium carbonate ($Na_2CO_3$), and sodium hydroxide (NaOH).

As part of the coagulation bath liquid will be entrained by the cellulose fibers or film withdrawn 109 from the coagulation vessel 104, the fibers or film are typically washed 105 to remove coagulation sodium salt, e.g. sodium carbonate ($Na_2CO_3$), sodium hydroxide (NaOH) and further additives, if present, from the fibers of film before drying them. The amount of entrained coagulation bath liquid may be reduced by pressing the fibers or film before stretching 117 and/or washing 105 them. The washing 105 is typically performed in a series of washing steps (of which the first may also constitute a stretching step to improve the fiber tenacity). The cellulose fibers or film may be washed 105 with water 110. In the washing 105 of the fibers, the coagulation bath liquid entrained by the cellulose fibers or film will be mixed with the water 110 used in the washing step. Such mixtures of NaOH-based solvent, $Na_2CO_3$-based coagulation bath liquid and washing water 110 will be withdrawn from the spinning process at an appropriate point, generally being where the NaOH and $Na_2CO_3$ concentrations are the highest. Typically, the cellulose fibers or film and the washing water 110, respectively, are fed to the washing steps in a counter flow manner. Mixtures of NaOH-based solvent, $Na_2CO_3$-based coagulation bath liquid and washing water may be withdrawn from the washing step subsequent to the coagulation vessel or from the stretching step, if present.

The aqueous sodium hydroxide (NaOH) solution used to dissolve 114 the cellulose is diluted in the process of forming cellulose fibers or film from cellulose, in particular if the aqueous sodium hydroxide (NaOH) solution is mixed with water 110 in one or more of the washing steps 105. Before cooling 107 the withdrawn portion of the coagulation bath liquid it may be concentrated to facilitate the precipitation of the coagulation sodium salt, e.g. sodium carbonate ($Na_2CO_3$), and to increase the concentration of sodium hydroxide (NaOH). As recognized by the skilled person, this may be achieved by evaporation including heating the withdrawn portion of the coagulation bath. However, it is less preferred to further heat the withdrawn portion of the coagulation bath liquid, unless excess steam is available at the plant; especially as the next process step includes cooling 107 of the withdrawn portion of the coagulation bath liquid. As the temperature in the coagulation bath liquid and/or washing water 110 typically is elevated, e.g. to about 20 to 90° C., the withdrawn portion of the coagulation bath liquid may be concentrated by applying sub-atmospheric pressure to evaporate water. Apart from concentrating the withdrawn portion of the coagulation bath, this will also lower the temperature. As the next step involves further cooling of the withdrawn portion of the coagulation bath liquid, pre-cooling is advantageous.

Further, as recognized by the skilled person, heating and cooling of various streams in the present process may be accomplished by heat exchange. As an example, heat may be exchanged between the withdrawn portion 112 of the coagulation bath liquid and the separated remaining liquid phase 113 to pre-cool the withdrawn portion of the coagulation bath liquid prior to exposing it to the cooling of step 107.

In contrast to sodium hydroxide (NaOH), the solubility of the coagulation sodium salt in cold water should be very low. The solubility of e.g. sodium carbonate ($Na_2CO_3$) in cold water is very low. It was found that cooling 107 the withdrawn portion of the coagulation bath liquid to a temperature of −10° C. to −35° C., such as −10° C. to −32° C., −15° C. to −32° C., −15° C. to −30° C., or −20° C. to −30° C., will effectively precipitate sodium carbonate as solid sodium carbonate decahydrate ($Na_2CO_3$ 10*$H_2O$), which may be separated from the remaining liquid phase, leaving a NaOH solution with surprisingly low remaining amounts of sodium carbonate ($Na_2CO_3$). The precipitated solid sodium carbonate ($Na_2CO_3$) is heavier than the remaining liquid phase and may thus be gravimetrically separated. Upon cooling 107 the withdrawn portion of the coagulation bath liquid to a temperature of −10° C. or less, less than about 1 wt % dissolved sodium carbonate ($Na_2CO_3$) will remain in the remaining liquid phase. Further, lowering the temperature further will precipitate further sodium carbonate ($Na_2CO_3$). At −25° C. less than about 0.5 wt % dissolved sodium carbonate ($Na_2CO_3$) will remain in the remaining liquid phase. Typically, the remaining liquid phase will be diluted by water, for example by ice as will be elaborated more hereinafter, before being used in dissolving 114 cellulose. Thus, the remaining concentration of dissolved sodium carbonate ($Na_2CO_3$) will be even lower in the recovered sodium hydroxide solution, after such dilution.

As the precipitated coagulation sodium salt, e.g. sodium carbonate ($Na_2CO_3$), may be separated, it may be re-used in the coagulation bath liquid. Thus, at least a portion of the separated precipitated coagulation sodium salt, e.g. sodium carbonate ($Na_2CO_3$), may be provided to the coagulation vessel as coagulation bath liquid make-up 119. This is advantageous since it reduces the consumption of fresh coagulation sodium salt, e.g. sodium carbonate ($Na_2CO_3$).

Furthermore, applying a low temperature, i.e. $-10°$ C. to $-35°$ C., in precipitating sodium carbonate ($Na_2CO_3$) has further advantages in addition to effectively lowering the concentration of sodium carbonate ($Na_2CO_3$). At such low temperatures part of the water in the withdrawn portion of the coagulation bath liquid will freeze to floating ice, which may be gravimetrically separated from the precipitated solid sodium carbonate ($Na_2CO_3$) and the remaining liquid phase, respectively. The floating ice will be essentially free from contaminants, such as sodium carbonate ($Na_2CO_3$) or zinc oxide (if used). Separating ice will increase the concentration of sodium carbonate ($Na_2CO_3$), resulting in further precipitation thereof, and will also increase the concentration of sodium hydroxide (NaOH). Increasing the concentration of sodium hydroxide (NaOH) is attractive, as it will reduce, or often even completely dispense of, the need for further concentrating the remaining liquid phase before reusing it in dissolving 114 cellulose to provide a cellulose spin dope 103.

The recovered aqueous sodium hydroxide (NaOH) solution, or a part thereof, provided by cooling 107 the withdrawn portion of the coagulation bath liquid to a temperature of $-10°$ C. to $-35°$ C., such as $-10°$ C. to $-32°$ C., $-15°$ C. to $-32°$ C., $-15°$ C. to $-30°$ C., or $-20°$ C. to $-30°$ C., is preferably used in dissolving 114 the cellulose to provide the cellulose spin dope 103 in order to improve the overall process economy. By applying such a cooling step, an efficient process for forming cellulose fibers or film from dissolved cellulose, in which sodium hydroxide may be reused as cellulose solvent 102 also for non-derivatized, or low derivatized, cellulose is provided.

As already discussed, a further advantage is that zinc oxide (ZnO), if used to improve the solubility of cellulose in the spin dope 103, is not precipitated upon cooling 107 to a temperature in the range of $-10°$ C. to $-35°$ C. As zinc oxide (ZnO) is tedious to re-dissolve once it has precipitated this is advantageous. Further, it may be hard to separate precipitated zinc oxide (ZnO) from precipitated coagulation sodium salt, e.g. sodium carbonate ($Na_2CO_3$). According to an embodiment, the temperature in the range of $-10°$ C. to $-35°$ C. is controlled to a temperature at which at least 75 wt % of the zinc oxide (ZnO) present in the coagulation bath liquid remains dissolved after the cooling 107.

Actually, the sodium hydroxide (NaOH) concentration achieved during the cooling 107 step may be so high, that the separated liquid phase comprising sodium hydroxide (NaOH) may have to be diluted before being used to dissolve cellulose. As already mentioned, the separated floating ice is essentially free from contaminants. Thus, a portion of the separated floating ice may be used to dilute the separated remaining liquid phase comprising sodium hydroxide (NaOH) and to provide the desired concentration of sodium hydroxide (NaOH).

Though a major proportion of the coagulation sodium salt (e.g. sodium carbonate ($Na_2CO_3$)) is removed in the separation step 118, the process may according to an embodiment comprise an optional further purification step 125 for, at least partly, removing any remaining coagulation sodium salt (e.g. sodium carbonate ($Na_2CO_3$)) from the separated remaining liquid phase 113 comprising sodium hydroxide (NaOH). For applications requiring sodium hydroxide (NaOH) comprising no, or essentially no, remaining coagulation sodium salt, such a further purification step 125 may be advantageous. Various examples of processes for removing a coagulation sodium salt (e.g. sodium carbonate ($Na_2CO_3$)) are known to the skilled person. Examples of such processes include electro dialysis, ion-exchange, addition of a coagulation sodium salt absorbing chemical, e.g. a carbonate absorbing chemical, and eutectic crystallization of sodium hydroxide (NaOH).

As the remaining amount of coagulation sodium salt (e.g. sodium carbonate ($Na_2CO_3$)) in the separated remaining liquid phase 113 comprising sodium hydroxide (NaOH) is very low (typically more than 90 wt % of the coagulation sodium salt, e.g. sodium carbonate ($Na_2CO_3$), is separated in the separation step 118), the further purification step 125 for removing the coagulation sodium salt (e.g. sodium carbonate ($Na_2CO_3$)) could be run as a dead-end operation, i.e. it could be run for a long period of time with only a single output stream being the further purified separated remaining liquid phase comprising sodium hydroxide (NaOH), whereas the collected minor amounts of coagulation sodium salt could be removed periodically.

According to an embodiment, the further purification step 125 for removing any remaining coagulation sodium salt (e.g. sodium carbonate ($Na_2CO_3$)) from the separated remaining liquid phase 113 comprising sodium hydroxide (NaOH) comprises eutectic crystallization 125' of sodium hydroxide (NaOH). In a process comprising eutectic crystallization 125' of sodium hydroxide (NaOH), the cooling step 107 is followed by a further purification step 125 involving cooling the withdrawn portion of the coagulation bath liquid to the eutectic point of the phase diagram of water and NaOH at about 20 wt % NaOH. There may, hence, be a first cooling step 107 being the major step, in which most of the solid coagulation sodium salt, e.g. sodium carbonate ($Na_2CO_3$), is removed, and a final cooling step, being included in the further purification step 125, bringing the remaining part of the withdrawn portion of the coagulation bath liquid to the eutectic point of the phase diagram of water and NaOH.

If the cooling is continued once the eutectic point of the phase diagram of water and sodium hydroxide (NaOH) has been reached, crystals of absolutely salt-free NaOH-hydrate will start precipitating (it should be observed though, that the crystals may comprise trace amounts of liquid inclusions or liquid bound to the crystal surfaces). As the temperature remains constant at the eutectic point (the removed heat is balanced by the heat released in the crystallization) only very little additional water will be frozen to ice. The sodium hydroxide (NaOH) will crystalize as NaOH-hydrate, thus water will still be removed from the solution. Given that the withdrawn portion of the coagulation bath liquid anyhow is cooled as part of the process, in step 107, further cooling to achieve eutectic crystallization 125' does not require that much additional energy, and therefore represents a preferred manner of removing remaining coagulation sodium salt (e.g. sodium carbonate ($Na_2CO_3$)) from the separated remaining liquid phase 113 comprising sodium hydroxide (NaOH).

As recognized by the skilled person purification by eutectic crystallization 125' may involve supersaturation of solutes in a solution. Supersaturation in the present process implies that co-precipitation of the coagulation sodium salt may be essentially avoided in eutectically crystallizing sodium hydroxide (NaOH). A potential precipitation of the coagulation sodium salt remains idle if there are no nuclei onto which the excess of coagulation sodium salt may deposit. This is due to a thermodynamic threshold of nucleation caused by the variation in dissolution-crystallization enthalpy with crystal size. Consequently a liquid composed of two solutes in solution, e.g. an aqueous solution comprising sodium hydroxide (NaOH) and sodium carbonate ($Na_2CO_3$), may be circulated between two vessels, or two zones of a single vessel, in which nuclei of only one of the two solutes (e.g. sodium hydroxide (NaOH) and sodium carbonate ($Na_2CO_3$), respectively) is available in each zone or vessel, while thermal energy is removed from said liquid (i.e. the liquid is cooled), to cause selective precipitation of only one of the solutes in the respective vessel or zone.

In an embodiment involving a further purification step 125, e.g. eutectic crystallization 125' of sodium hydroxide (NaOH), only part of the separated remaining liquid phase 113 comprising sodium hydroxide (NaOH) may undergo the step of eutectic crystallization 125' of sodium hydroxide (NaOH). Hence, the liquid phase 113 may be split into two portions: a first portion that undergoes eutectic crystallization 125', and a second portion which by-passes the eutectic crystallization 125' (cf. the dashed arrow in FIG. 1, by-passing the purification step 125). The solid NaOH-hydrate obtained by exposing the first portion to eutectic crystallization may subsequently be dissolved in the remaining part, i.e. the second portion, of the separated liquid phase 113 comprising sodium hydroxide (NaOH), or a part thereof, and the combined stream may then be used in the step of dissolving 114 the cellulose and providing the cellulose spin dope 103. Thereby, any degree of intermediate purity may be obtained without having to cool the entire stream of the remaining liquid phase 113 to the eutectic point.

Figure 2:
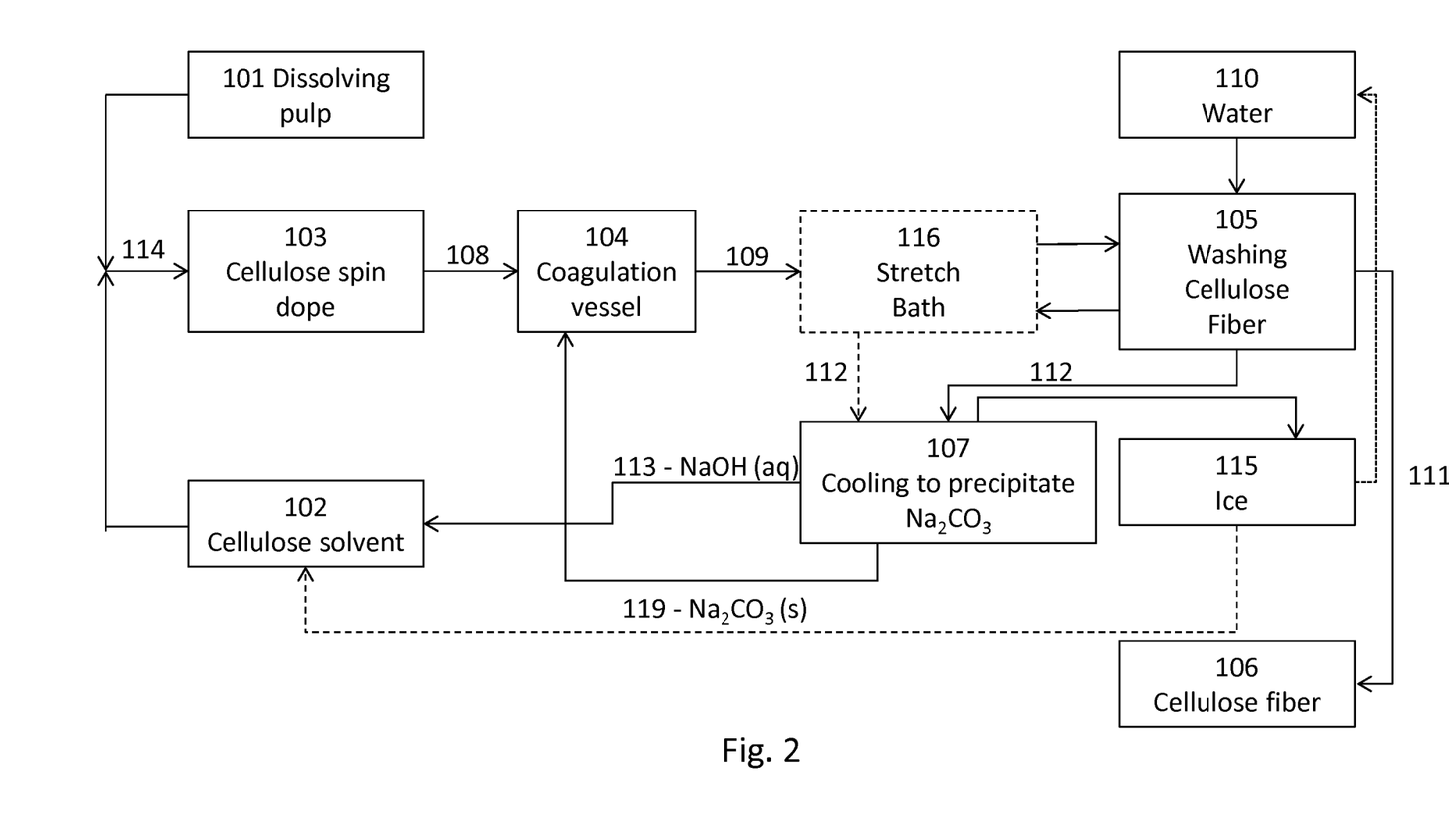
FIG. 2 depicts a flow chart of an embodiment of a process for cellulose fiber spinning and film forming, employing dissolving pulp dissolved in aqueous sodium hydroxide solution as the spin dope, in which process sodium hydroxide is recovered for reuse as solvent.
Figure 3:
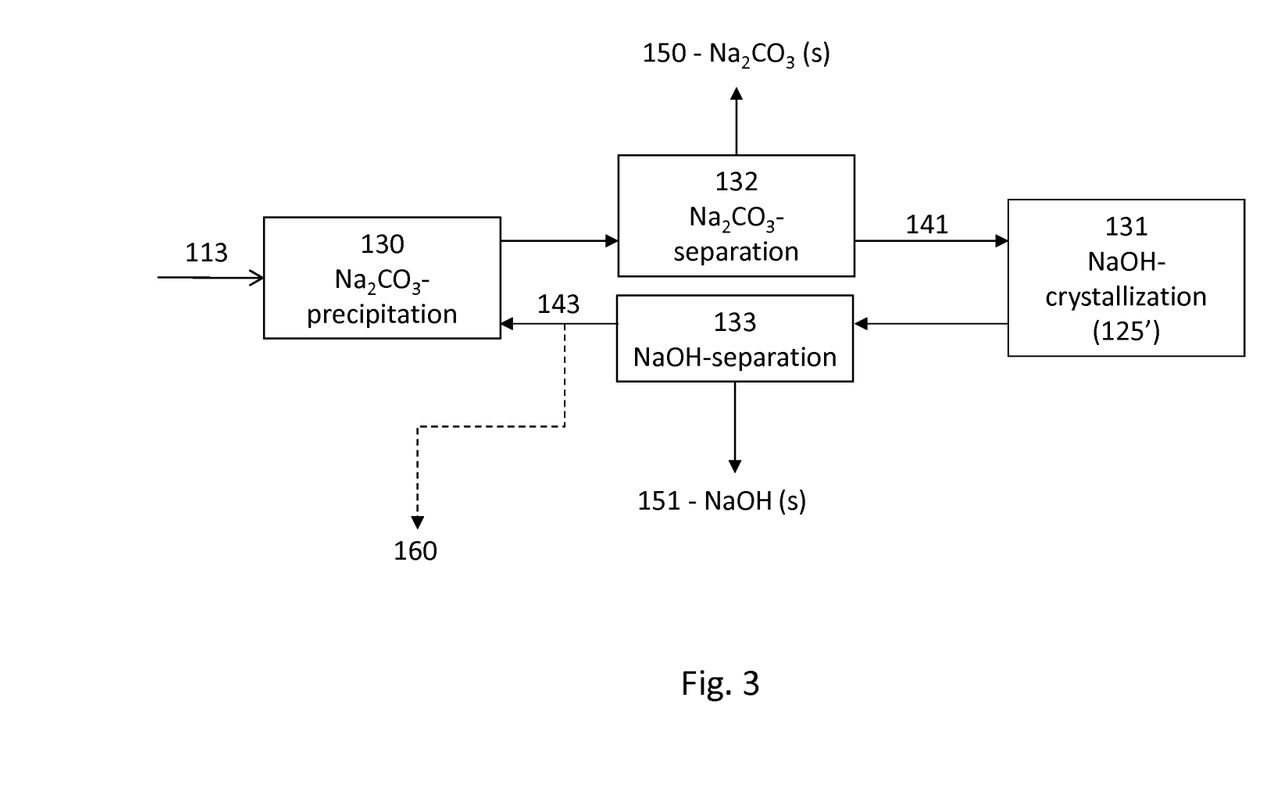
FIG. 3 depicts a flow chart of part of an embodiment wherein eutectic crystallization of sodium hydroxide (NaOH) is utilized to remove, at least partly, remaining coagulation sodium salt (e.g. sodium carbonate ($Na_2CO_3$)) from a liquid phase comprising sodium hydroxide (NaOH) before using the sodium hydroxide (NaOH) in dissolving cellulose to provide a cellulose spin dope.

In FIG. 3, a process scheme for a further purification step in the form of eutectic crystallization 125' a of sodium hydroxide (NaOH) is provided. As outlined above, the separated remaining liquid phase 113 comprising sodium hydroxide (NaOH) is further cooled, in a first vessel 130, to the eutectic point of the phase diagram of water and sodium hydroxide (NaOH), causing further precipitation of the coagulation sodium salt, e.g. sodium carbonate ($Na_2CO_3$) in the first vessel 130. Thereafter, the precipitated coagulation sodium salt 150, e.g. sodium carbonate ($Na_2CO_3$), is removed in a coagulation sodium salt separator 132. The separator 132 may be a filter or any other suitable separation unit, such as sedimentation in the first vessel 130. By further removal of heat a remaining coagulation sodium salt depleted liquid phase 141 in a second vessel 131, NaOH-hydrate is eutectically crystallized. Crystallized NaOH-hydrate 151 is then removed in a NaOH-hydrate separator 133, which may be a filter or any other suitable separation unit, such as sedimentation in the second vessel 131. After crystallized NaOH-hydrate 151 has been separated, part or all of a sodium hydroxide (NaOH) depleted liquid phase 143 is returned to the first vessel 130. Optionally part 160 of the sodium hydroxide (NaOH) depleted liquid phase 143 is taken out and not returned to the first vessel 130. Taking out part 160 of the sodium hydroxide (NaOH) depleted liquid phase 143 may serve to avoid accumulation of minor impurities. The crystallized NaOH-hydrate 151 may be used to form the cellulose solvent 102 (FIG. 2), for example by mixing the crystallized NaOH-hydrate 151 with a second portion of the remaining liquid phase 113 not having undergone further purification.

A further embodiment relates to a process for recovering an aqueous sodium hydroxide (NaOH) cellulose solvent from a spent coagulation bath liquid comprising aqueous coagulation sodium salt, e.g. sodium carbonate ($Na_2CO_3$), and sodium hydroxide (NaOH). In the method, the spent coagulation bath liquid is cooled to a temperature of $-10°$ C. to $-35°$ C., such as $-10°$ C. to $-32°$ C., $-15°$ C. to $-32°$ C., $-15°$ C. to $-30°$ C., or $-20°$ C. to $-30°$ C. As already described this will result in precipitation of solid coagulation sodium salt, e.g. sodium carbonate ($Na_2CO_3$), being heavier than a remaining liquid phase. Further, the cooling will freeze water to form floating ice. The cooling will thus decrease the concentration of the coagulation sodium salt, e.g., sodium carbonate ($Na_2CO_3$), and increase the concentration of sodium hydroxide (NaOH) in the remaining liquid phase. Further, the remaining liquid phase may be separated, such as gravimetrically, from the precipitated solid coagulation sodium salt, e.g. sodium carbonate ($Na_2CO_3$), and the floating ice, respectively, thereby providing recovered aqueous sodium hydroxide (NaOH) cellulose solvent. The separated remaining liquid phase comprising sodium hydroxide (NaOH) may be diluted with at least a portion of the separated floating ice to lower the concentration of sodium hydroxide (NaOH). Such a method of recovering an aqueous sodium hydroxide (NaOH) cellulose solvent from a spent coagulation bath liquid comprising, e.g., aqueous sodium carbonate ($Na_2CO_3$) and sodium hydroxide (NaOH) is useful in a process for forming cellulose fibers or film from dissolved cellulose as it allows for re-using sodium hydroxide (NaOH) in dissolving cellulose.

Figure 1:
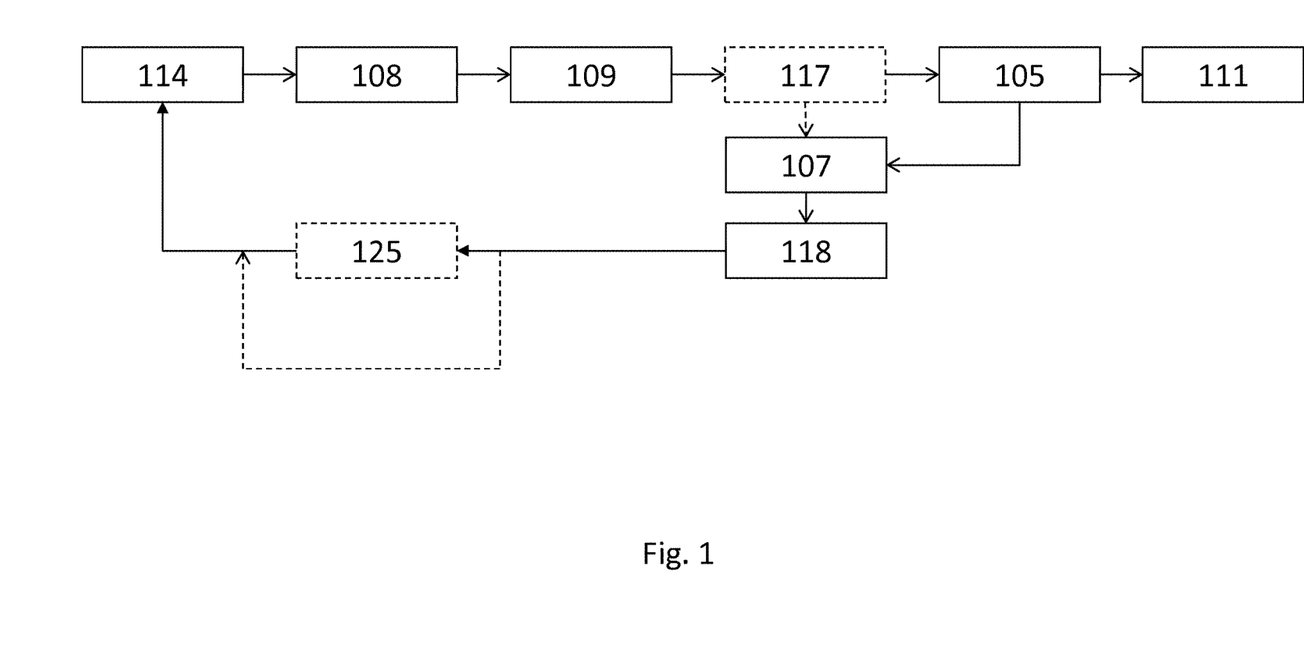
FIG. 1 depicts a process scheme of the various process steps in an embodiment of a process for cellulose fiber spinning and film forming, employing dissolving pulp dissolved in aqueous sodium hydroxide solution as the spin dope, in which process sodium hydroxide is recovered for reuse as solvent.

According to an exemplary embodiment (cf. the process scheme in FIG. 1 and the flow chart in FIG. 2), dissolving pulp 101 is dissolved 114 in a cellulose solvent 102, comprising dissolved aqueous sodium hydroxide (NaOH), to provide a cellulose spin dope 103. The cellulose spin dope 103 is extruded 108 through a spinneret into a coagulation vessel 104 comprising a coagulation bath liquid comprising an aqueous sodium carbonate ($Na_2CO_3$) solution to precipitate/coagulate cellulose fibers. The precipitated cellulose fibers are withdrawn 109 from the coagulation vessel 104. The coagulation bath liquid will, after some time, contain a mixture of sodium carbonate ($Na_2CO_3$) and sodium hydroxide (NaOH), wherein the latter originates from the cellulose spin dope 103. To a lesser or larger degree, depending on the detailed design of the individual stages, the coagulation bath liquid will be entrained by the precipitated cellulose fibers, meaning that subsequent stages, e.g. stretching and washing stages as will be described in more detail hereinafter, will also receive a portion of the coagulation bath liquid comprising the aqueous solution of sodium carbonate ($Na_2CO_3$) and sodium hydroxide (NaOH). Optionally, the withdrawn cellulose fibers are subjected to fiber stretching 117 in a stretch bath 116. The withdrawn precipitated cellulose fibers are washed 105 with water 110 and the washed precipitated cellulose fibers are withdrawn 111 from the washing step or the stretch bath 116 to provide cellulose fibers 106. The spent washing water 112 comprising dissolved sodium carbonate ($Na_2CO_3$) and sodium hydroxide (NaOH) may optionally be subjected to evaporative treatment, preferably at sub-atmospheric pressure and relatively low temperature, such as lower than 50° C., to reduce the amount of water. Solutions containing sodium hydroxide (NaOH) and sodium carbonate ($Na_2CO_3$) in aqueous solution and suitable for recovery could be withdrawn the stretch bath 116, and/or the washing step 105. Further, a solution containing sodium hydroxide (NaOH) and sodium carbonate ($Na_2CO_3$) in aqueous solution and being suitable for recovery could be withdrawn from the coagulation vessel 104. The aqueous solution/-s containing sodium hydroxide (NaOH) and sodium carbonate ($Na_2CO_3$) is cooled 107 to a temperature of −10° C. to −35° C. to precipitate solid sodium carbonate ($Na_2CO_3$) and to freeze water to floating ice. The remaining liquid phase is separated 118 from the precipitate solid sodium carbonate ($Na_2CO_3$), being heavier than the remaining liquid, and the floating ice, respectively. The separated remaining liquid phase 113 comprising sodium hydroxide (NaOH) is used as cellulose solvent 102 in dissolving the dissolving pulp 101. Optionally, remaining coagulation sodium salt, such as sodium carbonate ($Na_2CO_3$), may be removed, at least partly, from the separated remaining liquid phase 113 comprising sodium hydroxide (NaOH) before using the separated remaining liquid phase 113 in the step of dissolving 114 the cellulose and providing the cellulose spin dope 103, in a further purification step 125. As outlined above and as shown in FIG. 1 (cf. the dashed arrow by-passing the purification step 125), only part of the separated remaining liquid phase 113 may undergo the further purification step 125, whereas part of the separated remaining liquid phase 113 is used directly in the step of dissolving 114 the cellulose and providing the cellulose spin dope 103. Further, separated precipitated sodium carbonate ($Na_2CO_3$) is used as coagulation bath liquid make-up 119. The separated ice 115 may optionally be used in diluting separated remaining liquid phase 113 comprising sodium hydroxide (NaOH) to obtain the proper sodium hydroxide (NaOH) concentration for the preparation of cellulose spin dope 103. Further, at least a part of the separated ice 115 may form part of water 110 used in washing 105 the withdrawn precipitated cellulose fibers.

Without further elaboration, it is believed that one skilled in the art may, using the preceding description, utilize the present invention to its fullest extent. The preceding preferred specific embodiments are, therefore, to be construed as merely illustrative and not limitative of the disclosure in any way whatsoever.

Although the present invention has been described above with reference to specific embodiments, it is not intended to be limited to the specific form set forth herein. Rather, the invention is limited only by the accompanying claims and other embodiments than the specific embodiments described above are equally possible within the scope of these appended claims.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous.

In addition, singular references do not exclude a plurality. The terms "a", "an", "first", "second" etc. do not preclude a plurality.

EXAMPLES

The following examples are mere examples and should by no means be interpreted to limit the scope of the invention, as the invention is limited only by the accompanying claims.

Example 1

A starting solution was prepared by mixing 1100 g of solvent (10 wt % NaOH; 1.5 wt % ZnO) with 200 g of coagulation bath liquid (18.3 wt % $Na_2CO_3$) to provide 1300 g of solution (containing 8.46 wt % NaOH; 2.81 wt % $Na_2CO_3$; 1.27 wt % ZnO). The solution was gradually cooled and samples were taken and analyzed.

TABLE 1

| | Remaining concentration of NaOH, $Na_2CO_3$, and ZnO respectively after precipitating $Na_2CO_3$ | | | | | |
|---|---|---|---|---|---|---|
| Compound | Start | −2.0° C. | −6.0° C. | −9.6° C. | −15.0° C. | −19.6° C. |
| NaOH (wt %) | 8.5 | 8.6 | 8.8 | 9.4 | 12.1 | 14.8 |
| $Na_2CO_2$ (wt %) | 2.9 | 2.5 | 1.6 | 1.3 | 0.92 | 0.65 |
| ZnO (wt %) | 1.1 | 1.1 | 1.2 | 1.3 | 1.7 | 2.2 |
| $Na_2CO_2$ (%) after dilution with ice to 8 wt % NaOH | 2.7 | 2.3 | 1.5 | 1.1 | 0.61 | 0.35 |

As can be seen from table 1, cooling the solution not only decreases the concentration of $Na_2CO_3$, but also increases the concentration of NaOH and ZnO at low temperatures. In the example, the concentration of NaOH and ZnO, respectively, starts to increase once the temperature is lowered below −10° C., due to freezing water to floating ice, which reduces the liquid mass in which these concentrations are present. Further, comparing the initial concentration of $Na_2CO_3$ and the one after the separated remaining liquid phase has been diluted clearly shows the additional effect of freezing out water to increase the concentration of NaOH.

The invention claimed is:
1. A process for forming cellulose fibers or film from dissolved cellulose, said process comprising the steps of:
dissolving (114) cellulose in an aqueous sodium hydroxide (NaOH) solution to provide a cellulose spin dope (103);
extruding (108) the cellulose spin dope (103) into a coagulation bath liquid comprising an aqueous coagulation sodium salt solution, the coagulation bath liquid being present in a coagulation vessel (104), to provide cellulose fibers or film;
withdrawing (109) the cellulose fibers or film from the coagulation vessel (104), and withdrawing, directly and/or indirectly, a portion of the coagulation bath liquid from the coagulation vessel (104); the withdrawn portion of the coagulation bath liquid comprising an aqueous solution of the coagulation sodium salt and sodium hydroxide (NaOH);
cooling (107) at least a portion of the withdrawn portion of the coagulation bath liquid to a temperature of −10° C. to −35° C. to precipitate solid coagulation sodium salt, being heavier than a remaining liquid phase, and to freeze water to floating ice, thereby decreasing the concentration of the coagulation sodium salt and increasing the concentration of sodium hydroxide (NaOH) in the remaining liquid phase;

separating (118) the remaining liquid phase from the precipitated solid coagulation sodium salt and the floating ice, respectively; and using at least a portion of the separated remaining liquid phase (113) comprising sodium hydroxide (NaOH) in said step of dissolving (114) the cellulose and providing the cellulose spin dope (103).

2. The process according to claim 1, wherein the coagulation sodium salt is selected from sodium salts wherein the counter ion is a carboxylate, an aliphatic or aromatic sultanate, an aliphatic or aromatic phosphonate, thiosulfate, or carbonate ion.

3. The process according to claim 2, wherein the coagulation sodium salt is sodium carbonate ($Na_2CO_3$).

4. The process according to claim 1, wherein at least a portion of the separated precipitated solid coagulation sodium salt is provided to the coagulation vessel (104) as coagulation bath liquid make-up (119).

5. The process according to claim 1, wherein the separated remaining liquid phase (113) comprising sodium hydroxide (NaOH) is diluted with at least a portion of the separated floating ice (115) before being used in said step of dissolving (114) the cellulose.

6. The process according to claim 1, wherein the cellulose fibers or film withdrawn from the coagulation vessel (104) are washed with water (110) in a washing step (105), at least a portion of the water (110) used in the washing step being mixed with the portion of the coagulation bath liquid withdrawn from the coagulation vessel (104) before said step of cooling (107) the withdrawn portion of the coagulation bath liquid.

7. The process according to claim 1, wherein the withdrawn portion of the coagulation bath liquid is concentrated before said step of cooling the withdrawn portion of the coagulation bath liquid.

8. The process according to claim 7, wherein said step of concentrating the withdrawn portion of the coagulation bath liquid involves applying sub-atmospheric pressure to evaporate water from the withdrawn portion of the coagulation bath liquid.

9. The process according to claim 1 wherein:
the cellulose spin dope (103) comprises 4 to 12 wt % cellulose; and/or
the cellulose in the cellulose spin dope (103) has a DP of 140 to 600, such as 180 to 600, 200 to 400, 160 to 400, or 180 to 300; and/or
the cellulose in the cellulose spin dope (103) has an intrinsic viscosity according to ISO5351:2010(E) of 115 to 450, such as 150 to 450 ml/g, 190 to 300 ml/g, 130 to 300 ml/g, or 140 to 230 ml/g; and/or
the cellulose spin dope (103) has a viscosity at 1 $s^{-1}$ of 1 to 500 Pas, preferably 5 to 100 Pas; and/or
the cellulose in the cellulose spin dope (103) has a degree of substitution DS of not more than 0.1, preferably not more than 0.05; and/or;
the cellulose spin dope (103) comprises 5 to 10 wt % NaOH.

10. The process according to claim 1, wherein the aqueous sodium hydroxide (NaOH) solution used in said step of dissolving (114) the cellulose comprises:
6 to 18 wt % NaOH, such as 7.5 to 12 wt % NaOH; and/or
less than 1.0 wt % sodium coagulation salt, such as less than 0.5 wt % sodium coagulation salt, preferably sodium carbonate ($Na_2CO_3$), preferably even less than 0.3 wt %; and
optionally up to 2.7 wt % zinc oxide (ZnO); and/or
optionally up to 15 wt % urea; and/or
optionally up to 15 wt % thiourea, such as up to 5 wt %; and/or
optionally up to 10 wt % PEG (or other low molecular weight polymeric water soluble additive), such as up to 2 wt %; and/or
optionally up to 0.5 wt % of surfactants added as a non-reactive additive to enhance solubility and/or delay gelation.

11. The process according to claim 1, wherein the aqueous sodium hydroxide (NaOH) solution used in said step of dissolving (114) the cellulose comprises 0.8 to 1.8 wt % zinc oxide (ZnO).

12. The process according to claim 1, wherein the coagulation bath liquid comprises 14 to 32 wt % sodium coagulation salt.

13. The process according to claim 11, wherein the temperature in said step of cooling (107) the withdrawn coagulation bath liquid to a temperature of −10° C. to −35° C. is controlled to a temperature at which at least 75 wt % of the zinc oxide (ZnO) present in the coagulation bath liquid remains dissolved in the remaining liquid phase.

14. The process according to claim 12, wherein the coagulation bath liquid comprises 14 to 32 wt % sodium carbonate ($Na_2CO_3$).

15. The process according to claim 1, wherein the temperature of the cellulose spin dope (103) upon extruding it into the coagulation bath liquid is 5° C. to 30° C.; and/or the temperature of the coagulation bath is 20° C. to 50° C., preferably 20° C. to 30° C.

16. The process according to claim 1, wherein the process comprises a further purification step (125) for removing, at least partly, remaining coagulation sodium salt, such as sodium carbonate (Na2CO3), from the separated remaining liquid phase (113) comprising sodium hydroxide (NaOH) before using the separated remaining liquid phase (113) in the step of dissolving (114) the cellulose and providing the cellulose spin dope (103).

17. The process according to claim 16, wherein the further purification step (125) is performed by electro dialysis, ion-exchange, addition of coagulation sodium salt absorbing chemical, eutectic crystallization (125') of sodium hydroxide (NaOH), or a combination of two or more of these.

18. The process according to claim 17, wherein the further purification step (125) comprises eutectic crystallization (125') of sodium hydroxide (NaOH), the eutectically crystallized sodium hydroxide (NaOH) (151), at least partly, being used in dissolving (114) the cellulose and providing the cellulose spin dope (103).

19. The process according to claim 16, wherein the aqueous sodium hydroxide (NaOH) solution used in dissolving (114) the cellulose to provide the cellulose spin dope (103), is provided by mixing separated remaining liquid phase (113) having undergone the purification step (125) with separated remaining liquid phase (113) not having undergone the purification step (125).

20. A process for recovering an aqueous sodium hydroxide (NaOH) cellulose solvent from a spent coagulation bath liquid comprising aqueous coagulation sodium salt and sodium hydroxide (NaOH), the method comprising the steps of:
cooling the spent coagulation bath liquid to a temperature of −10° C. to −35° C. to precipitate solid coagulation sodium salt, being heavier than a remaining liquid phase, and to freeze water to floating ice, thereby decreasing the concentration of coagulation sodium salt and increasing the concentration of sodium hydroxide (NaOH) in the remaining liquid phase; and separating the remaining liquid phase from the precipitated solid coagulation sodium salt and the floating ice, respectively, to provide recovered aqueous sodium hydroxide (NaOH) cellulose solvent.

21. The process according to claim 20, further comprising diluting the separated remaining liquid phase comprising sodium hydroxide (NaOH) with at least a portion of the separated floating ice to provide said recovered aqueous sodium hydroxide (NaOH) cellulose solvent.

22. The process according to claim 20, wherein the coagulation sodium salt is selected from sodium salts wherein the counter ion is a carboxylate, an aliphatic or aromatic sultanate, an aliphatic or aromatic phosphonate, thiosulfate, or carbonate ion.

23. The process according to claim 22, wherein the coagulation sodium salt is sodium carbonate ($Na_2CO_3$).

* * * * *